United States Patent
Cornman et al.

(10) Patent No.: US 12,497,074 B2
(45) Date of Patent: Dec. 16, 2025

(54) OPEN VEHICLE DOORS PREDICTION USING A NEURAL NETWORK MODEL

(71) Applicant: Waymo LLC, Mountain View, CA (US)

(72) Inventors: Andre Liang Cornman, San Francisco, CA (US); David Lee, San Carlos, CA (US); Yang Song, San Jose, CA (US); Zijian Guo, Sunnyvale, CA (US); Edward Stephen Walker, Jr., San Francisco, CA (US); Yuanfang Wang, Redmond, WA (US); Zhengli Zhao, Sunnyvale, CA (US); Hsu-kuang Chiu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 633 days.

(21) Appl. No.: 17/940,665

(22) Filed: Sep. 8, 2022

(65) Prior Publication Data

US 2023/0072020 A1    Mar. 9, 2023

Related U.S. Application Data

(60) Provisional application No. 63/242,291, filed on Sep. 9, 2021.

(51) Int. Cl.
*B60W 60/00* (2020.01)
*G06V 20/58* (2022.01)

(52) U.S. Cl.
CPC ......... *B60W 60/0015* (2020.02); *G06V 20/58* (2022.01); *B60W 2420/403* (2013.01);
(Continued)

(58) Field of Classification Search
CPC ....... B60W 60/0015; B60W 2420/403; B60W 2420/408; B60W 2554/4049; G06V 20/58; G06V 10/82
See application file for complete search history.

(56) References Cited

U.S. PATENT DOCUMENTS 10,055,653 B2    8/2018  Cohen et al.
10,156,851 B1 *  12/2018 Silver .................... G06V 20/58
(Continued)

FOREIGN PATENT DOCUMENTS

CN          110717365 A  *  1/2020 ............. G06N 3/045

OTHER PUBLICATIONS

"PointNet: Deep Learning on Point Sets for 3D Classification and Segmentation" by C. Qi et al., arXiv:1612.00593v2 Apr. 10, 2017 (Year: 2017).*

(Continued)

*Primary Examiner* — Michael V Kerrigan
*Assistant Examiner* — Tanya C Sienko
(74) *Attorney, Agent, or Firm* — Fish & Richardson P.C.

(57) ABSTRACT

Methods, systems, and apparatus, including computer programs encoded on a computer storage medium, for open vehicle doors prediction using a neural network model. One of the methods includes: obtaining sensor data (i) that includes a portion of a point cloud generated by a laser sensor of an autonomous vehicle and (ii) that characterizes a vehicle that is in a vicinity of the autonomous vehicle in an environment; and processing the sensor data using an open door prediction neural network to generate an open door prediction that predicts a likelihood score that the vehicle has an open door.

20 Claims, 4 Drawing Sheets

(52) U.S. Cl.
CPC ............... *B60W 2420/408* (2024.01); *B60W 2554/4049* (2020.02)

(56) References Cited

U.S. PATENT DOCUMENTS

| | | | |
|---|---|---|---|
| 2020/0079371 | A1 | 3/2020 | Sakamoto et al. |
| 2020/0202209 | A1 | 6/2020 | Mao et al. |
| 2021/0247196 | A1 | 8/2021 | Wells et al. |
| 2022/0227373 | A1* | 7/2022 | Harouche ............. B60W 40/04 |
| 2023/0028749 | A1* | 1/2023 | Russ ..................... G01S 7/4817 |

OTHER PUBLICATIONS

"RSN: Range Sparse Net for Efficient, Accurate LiDAR 3D Object Detection" by P. Sun et al., 2021 IEEE/CVF Conference on Computer Vision and Pattern Recognition (CVPR) Jun. 1, 2021 (Year: 2021).*

Machine translation of CN 110717365, downloaded Apr. 17, 2025 (Year: 2025).*

Real-time 2D-3D door detection and state classification on a low-power device. J. Ramoa et al., Sn Applied Aciences, 315, 590 Published Apr. 29, 2021 (Year: 2021).*

He et al., "Deep residual learning for image recognition," Proceedings of the IEEE conference on computer vision and pattern recognition, 2016, p. 770-778.

He et al., "Mask r-cnn," Proceedings of the IEEE international conference on computer vision, 2017, p. 2961-2969.

Qi et al., "Pointnet: Deep learning on point sets for 3d classification and segmentation," Proceedings of the IEEE conference on computer vision and pattern recognition, 2017, p. 652-660.

Ronneberger et al., "U-net: Convolutional networks for biomedical image segmentation," International Conference on Medical image computing and computer-assisted intervention, 2015, p. 234-241.

Sun et al., "RSN: Range Sparse Net for Efficient, Accurate LiDAR 3D Object Detection," Proceedings of the IEEE/CVF Conference on Computer Vision and Pattern Recognition, 2021, p. 5725-5734.

Szegedy et al., "Inception-v4, inception-resnet and the impact of residual connections on learning, " Thirty-first AAAI conference on artificial intelligence, Feb. 12, 2017, 12 pages.

* cited by examiner

OPEN VEHICLE DOORS PREDICTION USING A NEURAL NETWORK MODEL

CROSS-REFERENCE TO RELATED APPLICATION

This application claims priority to U.S. Provisional Application No. 63/242,291, filed on Sep. 9, 2021. This disclosure of the prior application is considered part of and is incorporated by reference in the disclosure of this application.

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for using an open door prediction neural network to predict whether another vehicle in the vicinity of an autonomous vehicle is in an open door state, i.e., has an open door as opposed to having all doors closed. Vehicles with open doors are much more likely to have people entering or exiting the vehicles. Vehicles with open doors are also much more likely to be stationary. By using the open door prediction neural network when planning a future trajectory of the autonomous vehicle, a planning system of the autonomous vehicle can take into consideration (i) the likelihood that people entering or exiting the open doors of the vehicles in the environment and (ii) the likelihood that the vehicles with open doors are stationary.

The open door can include any door of the vehicle that might be in an open state, such as a left door, a right door, a hood, a trunk, a sliding door, a backdoor, and so on.

In general, one innovative aspect of the subject matter described in this specification can be embodied in methods that include the actions of obtaining sensor data (i) that includes a portion of a point cloud generated by a laser sensor of an autonomous vehicle and (ii) that characterizes a vehicle that is in a vicinity of the autonomous vehicle in an environment; and processing the sensor data using an open door prediction neural network to generate an open door prediction that predicts a likelihood score that the vehicle has an open door.

The foregoing and other embodiments can each optionally include one or more of the following features, alone or in combination. In particular, one embodiment includes all the following features in combination. The open door prediction further includes an open door segmentation prediction that includes, for each point of the portion of the point cloud, a per-point likelihood that predicts a likelihood that the point corresponds to the open door. The actions further include providing an input including the open door segmentation prediction to a vehicle segmentation model that is used by a planning system of the autonomous vehicle to generate a segmentation prediction of the vehicle. The open door prediction neural network includes a PointNet neural network. The open door prediction neural network includes a Range Sparse Net neural network. The sensor data further includes a second portion of a second point cloud generated by a second laser sensor that has a shorter range than the laser sensor. The sensor data further includes an image patch depicting the vehicle generated from an image of the environment captured by a camera sensor. The open door prediction neural network includes a first embedding subnetwork that is configured to process the portion of the point cloud to generate a point cloud embedding characterizing the vehicle; a second embedding subnetwork that is configured to process the image patch to generate an image embedding characterizing the vehicle; a concatenation layer that concatenates the point cloud embedding and the image embedding to generate a concatenated embedding; and an output subnetwork that is configured to process the concatenated embedding to generate the likelihood score that the vehicle has an open door. The open door includes at least one of the following: a left door, a right door, a hood, a trunk, a sliding door. The actions further include providing an input including the open door prediction to a planning system of the autonomous vehicle to plan a future trajectory of the autonomous vehicle.

Particular embodiments of the subject matter described in this specification can be implemented so as to realize one or more of the following advantages.

The systems and techniques can accurately predict a likelihood that a vehicle has an open door from a raw point cloud using an open door prediction neural network. Rather than projecting the lidar points of the point cloud to corresponding locations in a camera image, the open door prediction neural network can directly use the lidar points as an input and can make predictions directly from the lidar points. Rather than using a rule based model, the open door prediction neural network can be trained to generate open door predictions on training data that includes labels for the open doors.

In some implementations, the open door prediction neural network can further include a segmentation head to generate an open door segmentation prediction that includes a predicted likelihood of whether each lidar point in the point cloud corresponds to an open door. Training the open door prediction neural network to predict both classification and segmentation of the open door can improve the classification accuracy because the segmentation task can act as an attention mechanism, i.e., training the neural network to perform the segmentation task can cause the neural network to attend to, i.e., assign greater weight to, portions of the point cloud or to portions of internal representations of the point cloud generated by the neural network that are more relevant to accurately performing the classification task.

The systems and techniques can provide the open door prediction to a planning system of the autonomous vehicle to plan a future trajectory of the autonomous vehicle. For example, when determining that a nearby vehicle has an open door, the planning system of the autonomous vehicle can determine a trajectory of the autonomous vehicle that leaves more lateral space when passing by the nearby vehicle to avoid people who might appear near the open door. In some implementations, a perception system of the autonomous vehicle can generate a segmentation of a vehicle with an open door. However, the vehicle segmentation may not include accurate segmentation of the open door because the segmentation model might be trained on vehicles that do not have open doors. The perception system can take as input the open door segmentation generated by the open door segmentation neural network, and can generate an updated segmentation for the vehicle, e.g., by combining the open door segmentation with the vehicle segmentation. The updated segmentation for the vehicle can be more accurate in terms of the open door and can be provided to the planning system of the autonomous vehicle to plan a future trajectory of the autonomous vehicle.

In some implementations, the systems and techniques can also take as input a second portion of a second point cloud generated by a second laser sensor that has a shorter range than the first laser sensor to generate more accurate open door predictions for vehicles that are closer to the autonomous vehicle.

In some implementations, the systems and techniques can also take as input an image patch generated by a camera sensor that has a longer range than the laser sensor to generate more accurate open door predictions for vehicles that are far away from the autonomous vehicle. In some implementations, the image patch can provide color information and two-dimensional geometric information, which can be helpful for the system to detect the open doors more accurately.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The technology in this specification is related to using an open door prediction neural network to predict whether another vehicle in the vicinity of an autonomous vehicle is in an open door state, i.e., has an open door as opposed to having all doors closed.

The open door can include any door of the vehicle that might be in an open state, such as a left door, a right door, a hood, a trunk, a sliding door, a backdoor, and so on.

Figure 1:
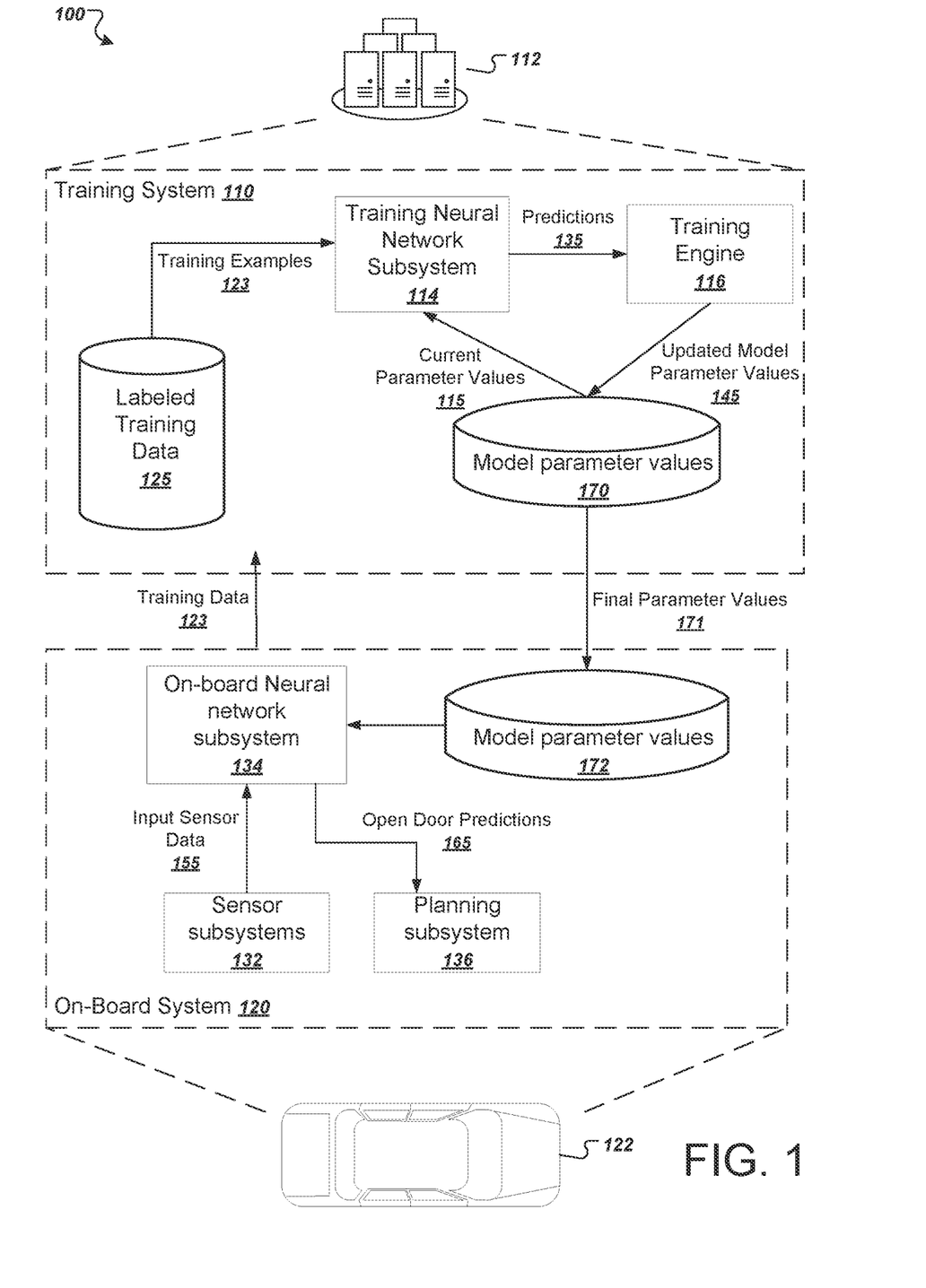
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. In some cases, the vehicle 122 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 122 can autonomously apply the brakes if a prediction indicates that a human driver is about to collide with another vehicle. As another example, the vehicle 122 can have an advanced driver assistance system (ADAS) that assists a human driver of the vehicle 122 in driving the vehicle 122 by detecting potentially unsafe situations and alerting the human driver or otherwise responding to the unsafe situation. As a particular example, the vehicle 122 can alert the driver of the vehicle 122 or take an autonomous driving action when an obstacle is detected, when the vehicle departs from a driving lane, or when an object is detected in a blind spot of the human driver.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light.

The sensor subsystems 132 provide input sensor data 155 to an on-board neural network subsystem 134. The input sensor data 155 can include a portion of a point cloud generated by a laser sensor of an autonomous vehicle. A point cloud is a collection of points (i.e., lidar points) that measure three-dimensional information of the environment. Each point in the point cloud can represent a distance from the laser sensor to an object's external surface. Each point in the point cloud can be associated with additional information of the laser sensor, e.g., intensity, second return, elongation, and so on, and the additional information can also be processed as input to an open door neural network. The portion of the point cloud can characterize a vehicle that is in a vicinity of the autonomous vehicle 122 in an environment, i.e., can include points in a region that an object detector has determined is a measurement of another vehicle in the environment. For example, a vehicle is in the vicinity of an autonomous vehicle in an environment when the vehicle is within the range of at least one of the sensors of the autonomous vehicle. That is, at least one of the sensors of the autonomous vehicle can sense or measure the presence of the vehicle.

In some implementations, the input sensor data 155 can further include an image patch depicting the same vehicle characterized by the point cloud, and the image patch can be generated from an image of the environment captured by a camera sensor of the autonomous vehicle 122.

The on-board neural network subsystem 134 implements the operations of each layer of an open door prediction neural network trained to make open door predictions 165. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 can process the input sensor data 155 using an open door prediction neural network to generate an open door prediction 165 that includes a likelihood score that a nearby vehicle has an open door. In some implementations, the system can detect a vehicle in the vicinity of the autonomous vehicle using an object detector, generate a three-dimensional (3D) bounding box of the vehicle, and can identify lidar points of a point cloud inside the 3D bounding box. The system can process the lidar points inside the 3D bounding box using the open door prediction neural network to generate a likelihood score that the vehicle has an open door. For example, an open door prediction 165 can be a score of 0.9, indicating that a likelihood of 90% that the nearby vehicle has an open door.

The open door prediction neural network can include a neural network model trained to directly operate on lidar points of the point cloud. Rather than projecting the lidar points of the point cloud to corresponding locations in a camera image, the open door prediction neural network can directly use the lidar points as an input and can generate predictions directly from the lidar points. Rather than using a rule based model, the open door prediction neural network can be trained to generate open door predictions on training data that includes labels for the open doors. The open door prediction neural network can be configured to generate, from the point cloud data, a point cloud embedding characterizing the nearby vehicle, and the open door prediction neural network can generate an open door prediction 165 from the point cloud embedding.

In some implementations, the open door prediction neural network can further take as input an image patch depicting the same vehicle characterized by the point cloud as an input. The open door embedding neural network can generate an image embedding from the image patch. The open door embedding neural network can combine the point cloud embedding generated from the point cloud and the image embedding generated from the image patch, e.g., by concatenation, addition, or averaging of the two embeddings, to generate a combined embedding characterizing the vehicle. The open door embedding neural network can generate an open door prediction 165 from the combined embedding characterizing the vehicle.

In some implementations, the open door prediction neural network can include a multi-class classification model and the open door prediction can include a fine grained classification of the predicted open door, e.g., a left door, a right door, a hood, a trunk, a sliding door, and so on. For example, the open door prediction can include an overall score indicating whether a vehicle has an open door and a plurality of individual scores for each possible type of door to which the open door may belong. As another example, the open door prediction can include a plurality of individual scores for each possible type of door to which an open door may belong, without having a predicted overall score.

In some implementations, the open door prediction 165 can further include an open door segmentation prediction that includes, for each lidar point in the point cloud, a respective score that represents a predicted likelihood of whether the lidar point corresponds to an open door of the vehicle.

When a planning subsystem 136 receives the open door predictions 165, the planning subsystem 136 can use the one or more open door predictions 165 to make fully-autonomous or semi-autonomous driving decisions. In some implementations, the open door predictions 165 can be provided as an input to a planning system of the autonomous vehicle to plan a future trajectory of the autonomous vehicle 122. In some implementations, the open door predictions 165 can be provided as an input to a behavior prediction system of the autonomous vehicle 122 to predict a future behavior of a vehicle in the environment, e.g., predicting a future trajectory of the vehicle in the environment based on the vehicle's open door prediction 165.

For example, the open door prediction can be used to inform autonomous driving decisions that modify the future trajectory of the autonomous vehicle, e.g., by applying the brake in case a person is entering or leaving through the open door, or by increasing the lateral gap when passing by a vehicle with an open door.

Figure 2A:
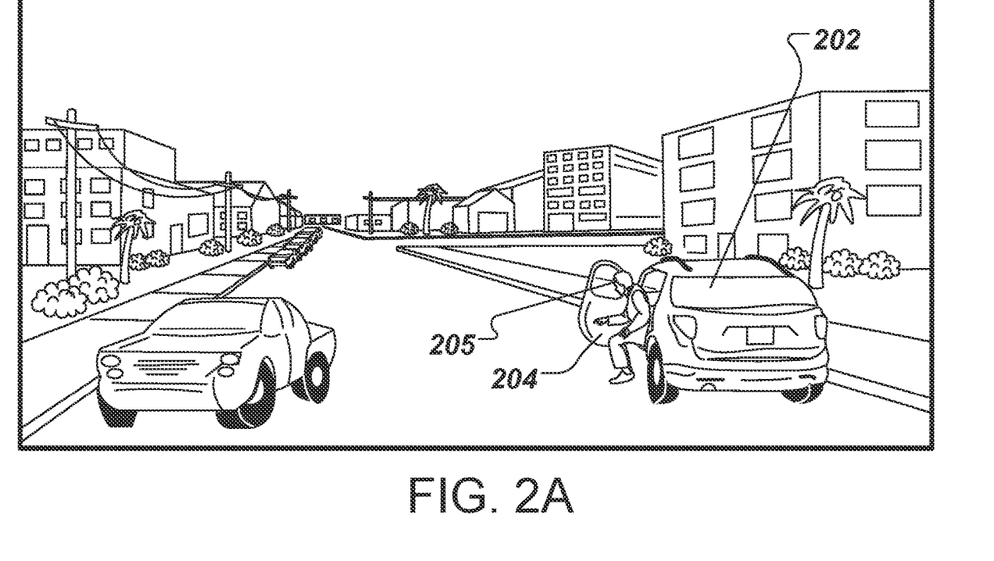
FIG. 2A-2B illustrates examples of vehicles with open doors.
Figure 2B:
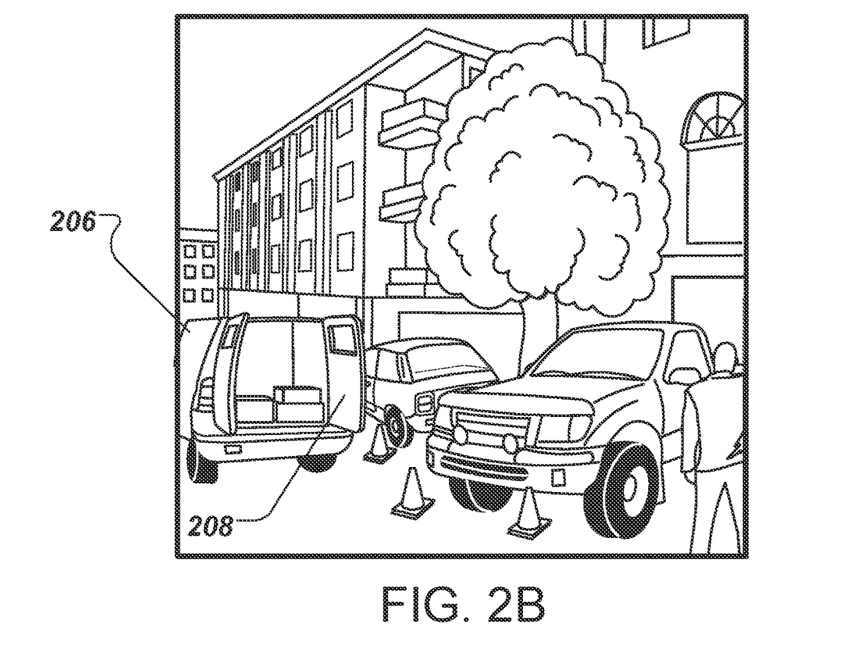

FIG. 2A-2B illustrates examples of vehicles with open doors.

FIG. 2A depicts an example environment in the vicinity of an autonomous vehicle. The lidar system of the autonomous vehicle can collect a point cloud of the environment that includes a vehicle 202. The left door 204 of the vehicle 202 is open. The on-board system of the autonomous vehicle can use an open door prediction neural network to predict whether the vehicle 202 has an open door. The open door prediction neural network can take as input a portion of the point cloud of the environment that characterizes the vehicle 202 and can generate a likelihood score indicating that the vehicle 202 has an open door, e.g., a score of 0.95. Based on this open door prediction, the planning system of the autonomous vehicle can generate a future trajectory of the autonomous vehicle that has a larger lateral gap between the autonomous vehicle and the particular vehicle 202 to avoid the left door 204 of the particular vehicle 202 that is predicted to be open. Based on this open door prediction, the planning system of the autonomous vehicle can generate a future trajectory of the autonomous vehicle to slow down when approaching the particular vehicle 202 to avoid a pedestrian 205 who may appear from the open door 204.

FIG. 2B depicts another environment in the vicinity of an autonomous vehicle that includes a van 206. The lidar system of the autonomous vehicle can collect a point cloud of the environment that includes the van 206. The backdoors 208 of a van 206 are open. The van 206 may have stopped to load or unload items and the van 206 may not begin moving until after the backdoors 208 are closed. The open door prediction neural network on-board the autonomous vehicle can take as input a portion of the point cloud of the environment that characterizes the van 206 and can generate a likelihood score indicating that the van has an open door, e.g., a score of 0.98. Based on this open door prediction, the planning system of the autonomous vehicle can generate a future trajectory of the autonomous vehicle to slow down when approaching the van 206. The planning system of the autonomous vehicle can provide an alert to an operator of the autonomous vehicle 122 to slow down near the van 206.

Referring back to FIG. 1, the on-board neural network subsystem 134 can also use the input sensor data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make open door predictions from input sensor data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the open door prediction neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can include labeled training data 125. Each of the training examples 123 includes input sensor data as well as one or more labels that indicate whether a vehicle in the environment has an open door represented by the input sensor data.

In some implementations, the training example 123 can include additional labels. For example, when the open door prediction includes an open door segmentation prediction, the training example can include a ground truth segmentation label for the points of the training point clouds. As another example, when the open door prediction includes a multi-class classification for the possible types of doors, the training example can include a multi-class label indicating the type of the open door in the training example.

The training neural network subsystem 114 can generate, for each training example 123, one or more open door predictions 135. Each open door prediction 135 predicts a likelihood score of an open vehicle door characterized in the training example 123. A training engine 116 analyzes the open door predictions 135 and compares the open door predictions to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 3A:
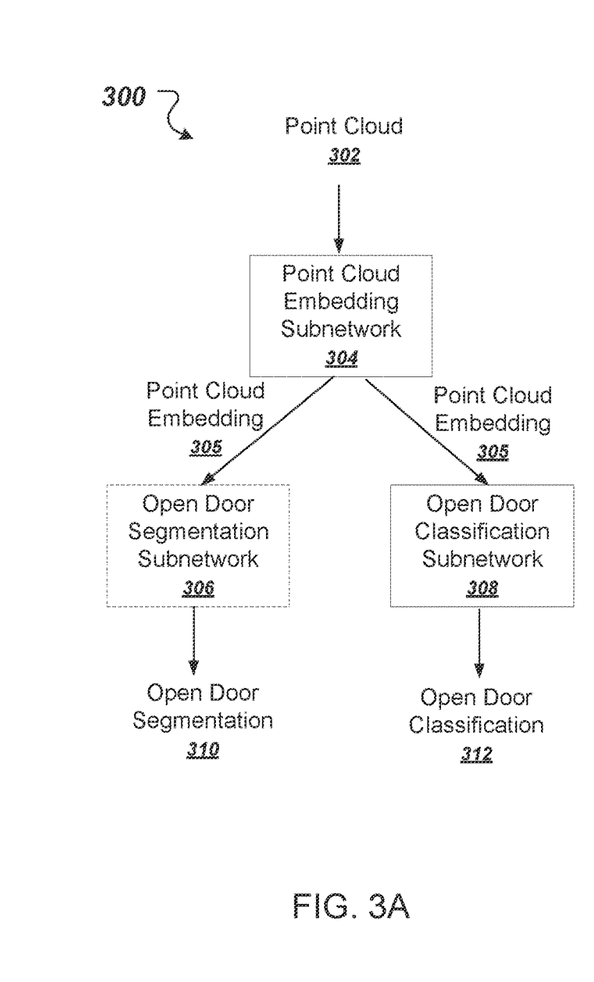
FIG. 3A is an example architecture of an open door prediction neural network.

FIG. 3A is an example architecture of an open door prediction neural network 300. The input sensor data includes a portion of a point cloud 302 generated by a laser sensor of an autonomous vehicle. The portion of the point cloud can characterize a vehicle that is in a vicinity of the autonomous vehicle in an environment.

The open door prediction neural network 300 includes a point cloud embedding subnetwork 304 that is configured to process point cloud 302 to generate a point cloud embedding 305 characterizing the vehicle that is in the vicinity of the autonomous vehicle. In some implementations, the point cloud embedding 305 can include one feature vector for each point in the point cloud 302, such that the dimension information of the point cloud 302 remains in the point cloud embedding 305. For example, if the point cloud 302 includes 3000 points, the point cloud embedding 305 can be a matrix of dimension 3000×1024, including a feature vector of length 1024 for each point in the point cloud 302.

An embedding, as used in this specification, is a numeric representation generated from sensor data that characterizes a vehicle in the vicinity of the autonomous vehicle. In particular, an embedding is a numerical representation in an embedding space, i.e., an ordered collection of a fixed number of numeric values, where the number of numeric values is equal to the dimensionality of the embedding space. For example, the point cloud embedding can be a vector of floating point or other types of numeric values generated from a point cloud. Generally, an embedding subnetwork is a convolutional neural network that includes a number of convolutional layers and optionally, a number of deconvolutional layers. Each convolutional layer and deconvolutional layer has parameters whose values define the filters for the layer.

The open door prediction neural network 300 also includes an open door classification subnetwork 308 that is configured to process the point cloud embedding 305 to generate the open door prediction, e.g., the open door classification 312. The open door classification subnetwork 308 can include a number of convolutional layers, pooling layers, fully connected layers, with the last layer configured to generate one or more scores indicating whether a vehicle has an open door. The open door classification subnetwork can include all or a portion of a typical classification neural network, e.g., a RestNet (He, Kaiming, et al. "Deep residual learning for image recognition." *Proceedings of the IEEE conference on computer vision and pattern recognition.* 2016). In some implementations, the open door classification subnetwork 308 can include just a plurality of fully connected layers.

In some implementations, the open door prediction neural network 300 can include a PointNet neural network (Qi, Charles R., et al. "Pointnet: Deep learning on point sets for 3d classification and segmentation." Proceedings of the IEEE conference on computer vision and pattern recognition. 2017). For example, the point cloud embedding subnetwork 304 can include a PointNet neural network. The PointNet neural network can generate an efficient and effective feature representation of the points in the point cloud, and can be trained to generate accurate open door predictions from the point cloud.

In some implementations, the open door prediction neural network can include a Range Sparse Net neural network (Sun, Pei, et al. "RSN: Range Sparse Net for Efficient, Accurate LiDAR 3D Object Detection." Proceedings of the IEEE/CVF Conference on Computer Vision and Pattern Recognition. 2021). For example, the point cloud embedding subnetwork 304 can include a Range Sparse Net neural network. The Range Sparse Net can use sparse convolution operations over a fixed size three-dimensional voxel grid, and can be more efficient with a large number of input points in the point cloud. Instead of severely down-sampling the points in the raw point cloud data captured by the laser sensor, the open door prediction neural network can process more points at a time, e.g., 2048 points per detection instead of 1024 points. Therefore, the open door prediction neural network can generate a more refined point cloud embedding 305 that characterizes the features of the open door.

In some implementations, the open door prediction neural network 300 can further include an open door segmentation subnetwork 306 to generate an open door segmentation prediction 310 from the point cloud embedding 305. The point cloud embedding 305 can include one feature vector for each point in the point cloud 302. The open door segmentation subnetwork can include a number of convolutional layers, deconvolutional layers, pooling layers, fully-connected layers. The open door segmentation subnetwork can include all or part of a typical segmentation neural network, e.g., a U-Net (Ronneberger, Olaf, Philipp Fischer, and Thomas Brox. "U-net: Convolutional networks for biomedical image segmentation." *International Conference on Medical image computing and computer-assisted intervention.* Springer, Cham, 2015), or a mask R-CNN (He, Kaiming, et al. "Mask r-cnn." *Proceedings of the IEEE international conference on computer vision.* 2017). In some implementations, the open door segmentation subnetwork 306 can include just a plurality of fully connected layers. The open door segmentation prediction 310 can include, for each point of the portion of the point cloud 302, a per-point likelihood score that indicates a likelihood that the point corresponds to an open door.

For example, the open door prediction neural network can generate an open door prediction including (i) an open door classification 312, e.g., a classification score of 0.95 indicating that the left door of the vehicle is open, and (ii) an open door segmentation 310, e.g., a segmentation mask of the left door including a per-point classification score for each point in the point cloud 302.

Figure 3B:
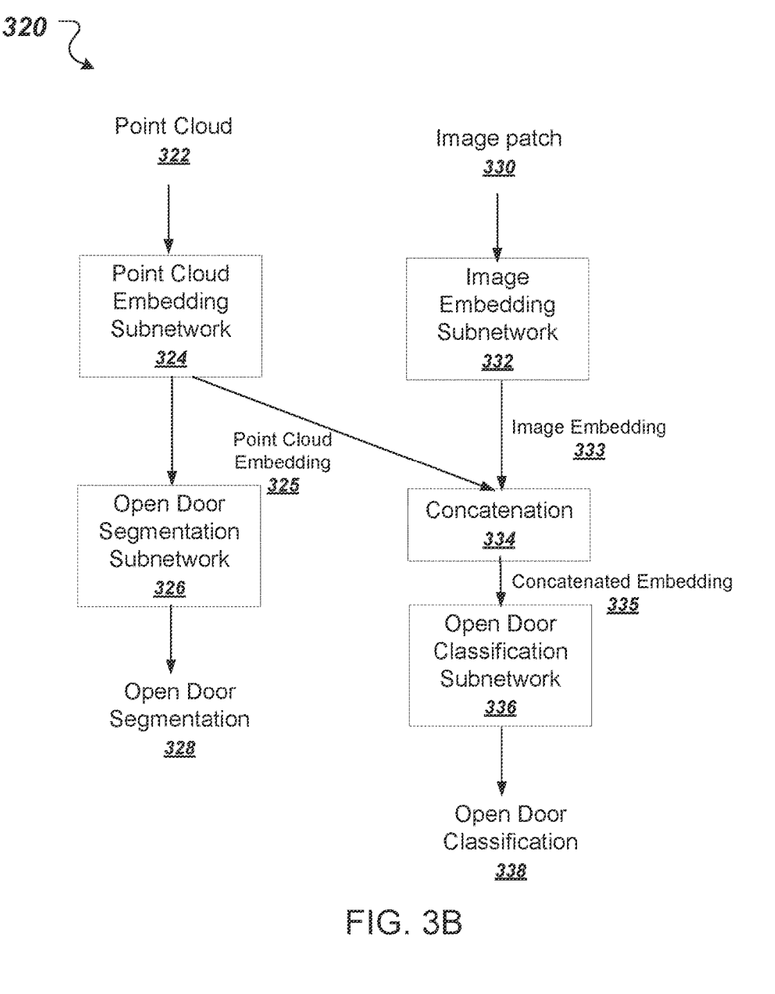
FIG. 3B is another example architecture of an open door prediction neural network.

FIG. 3B is another example architecture of an open door prediction neural network 320. In addition to the point cloud 322, the input sensor data can further include an image patch 330 depicting the same vehicle characterized by the point cloud 322. The image patch 330 can be generated from an image of the environment captured by a camera sensor of the autonomous vehicle.

For example, when the vehicle is far away from the autonomous vehicle, the lidar points of the point cloud can be too sparse to sufficiently characterize the vehicle. Because an image captured by the camera sensor of the autonomous vehicle can depict the vehicle in higher resolution, the image can provide additional information that characterizes the vehicle. The on-board system can detect the location of the vehicle in the image and can generate an image patch including the vehicle from the image, e.g., an image patch with 64 pixels by 64 pixels. In some implementations, the system can generate the image patch with extra padding regions outside the bounding box of the vehicle such that the open door outside the bounding box of the vehicle can be included.

The open door prediction neural network 320 can be configured to generate an open door prediction from the point cloud and the image patch. The open door prediction neural network 320 includes a point cloud embedding subnetwork 324 that is configured to process the portion of the point cloud 322 to generate a point cloud embedding 325 characterizing a vehicle. For example, the point cloud embedding subnetwork 324 can include a PointNet or a Range Sparse Net. The open door prediction neural network can further include an image embedding subnetwork 332 that is configured to process an image patch 330 to generate an image embedding 333 characterizing the vehicle. The image embedding subnetwork 332 can be configured to extract image features for the vehicle. The image embedding subnetwork 332 can include a convolutional neural network that includes one or more of the following: a convolutional layer, a max-pooling layer, a Rectified Linear Unit (ReLU) layer, a batch-norm layer, a fully-connected layer, and so on. For example, the image embedding subnetwork 332 can include a ResNet or an InceptionNet (Szegedy, Christian, et al. "Inception-v4, inception-resnet and the impact of residual connections on learning." Thirty-first AAAI conference on artificial intelligence. 2017).

The open door prediction neural network 320 further includes a concatenation layer 334 that concatenates the point cloud embedding and the image embedding to generate a concatenated embedding 335, e.g., by concatenation, addition, or averaging of the two embeddings. The open door prediction neural network 320 further includes an output subnetwork, e.g., the open door classification subnetwork 336, that is configured to process the concatenated embedding 335 to generate the open door prediction, e.g., an open door classification 338 indicating a likelihood that the vehicle has an open door. In some implementations, the point cloud embedding 325 can include one feature vector for each point in the point cloud 322, and the open door prediction neural network 320 can include an open door segmentation subnetwork 326 that can generate an open door segmentation prediction 328 of the open door from the point cloud embedding 325. The open door segmentation prediction 328 can include, for each point of the point cloud 322, a per-point likelihood score that indicates a likelihood that the point corresponds to an open door.

In some implementations, the open door prediction neural network 320 can be trained in multiple stages. For example, the training system can first train the portion of the model that processes the point cloud input 322, e.g., the point cloud embedding subnetwork 324 and the open door segmentation subnetwork 326. Then, to the train the full model 320, the system can load and freeze the weights of the portion of the model that processes point cloud 322, e.g., the blocks of 324 and 326, and the system can only train the image embedding subnetwork 332 and the open door classification subnetwork 336. In some other implementations, the open door prediction neural network 320 can be trained in an end-to-end approach instead of in multiple stages.

Figure 4:
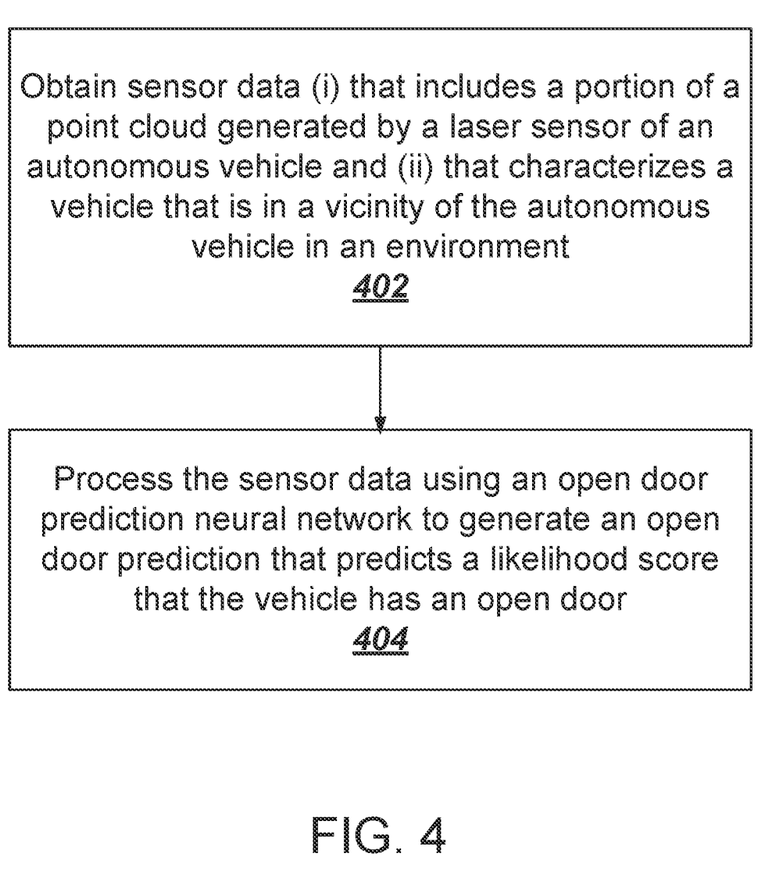
FIG. 4 is a flow chart of an example process for open vehicle door prediction.

FIG. 4 is a flow chart of an example process for open vehicle door prediction. The example process in FIG. 4 uses a forward inference pass through a machine learning model that has already been trained or is being trained to predict whether another vehicle in the vicinity of an autonomous vehicle is in an open door state. The example process can thus be used during training or to make predictions from unlabeled input, e.g., in a production system. The process will be described as being performed by a system of one or more computers in one or more locations, appropriately programmed in accordance with this specification. For example, the system can be an on-board system located on-board a vehicle, e.g., the on-board system 120 of FIG. 1, or a training system located away from a vehicle, e.g., the training system 110 of FIG. 1.

The system obtains sensor data (i) that includes a portion of a point cloud generated by a laser sensor of an autonomous vehicle and (ii) that characterizes a vehicle that is in a vicinity of the autonomous vehicle in an environment (402).

For example, the system can obtain a point cloud generated by a laser sensor, and the point cloud can depict a vehicle that is in the vicinity of the autonomous vehicle in the environment. The system can obtain a context region centered at the vehicle. The system can obtain a portion of the point cloud by cropping the points within the context region. The portion of the point cloud can characterize the vehicle in the vicinity of the autonomous vehicle.

The system processes the sensor data using an open door prediction neural network to generate an open door prediction that predicts a likelihood score that the vehicle has an open door (404). The open door prediction neural network can include a point cloud embedding subnetwork and an open door classification subnetwork. The system can process the point cloud input using the point cloud embedding subnetwork to generate point cloud embedding. Based on the point cloud embedding, the system can generate a classification output indicating whether the vehicle has an open door using the open door classification subnetwork.

In some implementations, the above mentioned first laser sensor may not capture point clouds for objects that are outside a predetermined range of the first laser sensor. For example, the first laser sensor can be a mid-range sensor, and the point cloud generated by the first laser sensor may not be able to characterize objects that are either very close to the autonomous vehicle, or far away from the autonomous vehicle.

In some implementations, besides the portion of the point cloud generated by the first laser sensor, the sensor data can further include a portion of a second point cloud generated by a second laser sensor that has a shorter range than the first laser sensor. That is, the sensor data includes both long-range lidar data, e.g., 50 to 200 meters from the first laser sensor, and short-range lidar data, e.g., 0 to 50 meters from the second laser sensor. The open door prediction neural network can detect one or more near-range open doors, e.g., an open back door of a nearby vehicle using the short-range lidar data generated by the second laser sensor of the autonomous vehicle. The input to the open door neural network can be a combined point cloud that combines both the short range lidar points and the regular range lidar points. The open door neural network can be trained to generate an open door prediction from the combined point cloud, e.g., an open door classification and/or an open door segmentation.

For example, referring to FIG. 3B, the point cloud embedding subnetwork 324 can take both short range points and long range points as input to extract a point cloud embedding 325 that includes local point feature (e.g., one feature vector per point) and global point features (e.g., one feature vector per detected vehicle). The open door segmentation subnetwork 326 can take the local point features as input to generate the point-wise open door segmentation 328. The global point features can be concatenated with the image embeddings 333 to generate the object-wise open door classification 338.

In some implementations, besides the portion of the point cloud generated by the first laser sensor, the sensor data can further include an image patch depicting the same vehicle characterized by the point cloud. The image patch can be generated from an image of the environment captured by a camera sensor of the autonomous vehicle. When the vehicle is far away from the autonomous vehicle, the lidar points of the point cloud can be too sparse to sufficiently characterize the vehicle. An image captured by the camera sensor of the autonomous vehicle can depict the vehicle in higher resolution. Therefore, the open door prediction neural network can be configured to generate a more accurate open door prediction from the point cloud and the image patch for the open doors of vehicles that are far away from the autonomous vehicle. In some implementations, the image patch can provide color information and two-dimensional geometric information. Therefore, the system can generate a more accurate open door prediction from the point cloud and the image patch.

In some implementations, the open door prediction neural network can take, as an additional input, context information of the vehicle to generate more accurate open door predictions. The context information of the vehicle can include, for example, the distance from the vehicle to the autonomous vehicle, the heading direction of the vehicle, the bounding box information of the vehicle, and so on.

For example, when the vehicle with an open door is far away from the autonomous vehicle, the points of the point cloud on the door of the vehicle can be sparse. The distance information can help the open door prediction neural network to generate more accurate predictions for vehicles that are far away from the autonomous vehicle.

As another example, the system can normalize the point cloud using heading information of the vehicle to improve open door prediction accuracy when there is occlusion or self-occlusion. For example, the system can transform the point cloud to a coordinate system that is aligned with the heading direction of the vehicle and the center of the vehicle. Therefore, the point clouds of different vehicles can be normalized across different vehicles and the open door prediction neural network can more accurately predict the open doors.

As another example, adding the predicted vehicle bounding box can provide location information of the vehicle to the open door prediction neural network and thus can improve the accuracy of the open door segmentation prediction. For example, the system can obtain lidar points inside and around the predicted vehicle bounding box and can use these lidar points as an input to the open door neural network. The system can project the predicted three-dimensional (3D) vehicle bounding box to the two-dimensional camera plane of a two-dimensional (2D) camera image, and can extract an image patch from the 2D camera image near the projection of the 3D vehicle bounding box. Thus, the system can collect the input information that is only relevant to the target vehicle and the system can generate a more accurate open door prediction from the input information.

The system can train the open door prediction neural network using training data. The training data can include sensor data depicting vehicles, e.g., a plurality of portions of point clouds characterizing vehicles that have an open door and vehicles that do not have an open door. The training data can include, for each portion of the point cloud, a respective label indicating whether the vehicle has an open door. For example, a human labeler can generate the label for a cluster of points in the point cloud that indicates whether the cluster of points corresponds to an open door. In some implementations, a human labeler can generate a segmentation label for the open door, e.g., a label for each point in the point cloud to indicate whether the point corresponds to an open door.

In some implementations, a label can be generated for a camera image that corresponds to the point cloud. Because the camera image may have higher resolution, the label can be a fine grained classification label indicating a particular kind of door of the vehicle, e.g., a left door, a right door, a trunk, a hood, a sliding door, and so on. The fine grained classification label can be used to generate a corresponding label for a point cloud, e.g., by mapping a label for the camera image to a label for the point cloud that corresponds to the camera image. The open door prediction neural network can be trained to generate fine grained classification of the open door using the fine grained labels.

The system can train the open door prediction neural network to perform open door classification using a loss function that includes a classification loss, e.g., a cross-entropy loss. In some implementations, the open door prediction neural network can be configured to generate an open door segmentation prediction, and the system can train the open door prediction neural network using a loss function that includes both the classification loss and a segmentation loss, e.g., a point-wise cross entropy loss. Training the open door prediction neural network to predict both classification and segmentation of the open door can improve the classification accuracy because the segmentation task can act as an attention mechanism. That is, training the neural network to perform the segmentation task can cause the neural network to attend to, i.e., assign greater weight to, portions of the point cloud or to portions of internal representations (e.g., embeddings or features) of the point cloud generated by the neural network that are more relevant to accurately performing the classification task.

In some implementations, the system can use a machine learning model to generate an open door prediction for a vehicle over a period of time. The system can use the open door prediction neural network to generate, from sensor data at each time point, a respective open door prediction at each time point over the period of time. For example, the system can take point cloud data captured at each of a plurality of frames, and the system can use the open door prediction neural network to generate a respective open door prediction at each of the plurality of frames.

The machine learning model can aggregate open door predictions predicted from the multiple frames of sensor data to generate a final open door prediction over the period of time corresponding to the multiple frames. The machine learning model can take the multiple open door predictions at the multiple time points as inputs and generate an open door prediction indicating a likelihood that the vehicle has an open door over the period of time.

In some implementations, the open door prediction can be provided as an input to a planning system of the autonomous vehicle to plan a future trajectory of the autonomous vehicle. In some implementations, the open door prediction can be provided as an input to a behavior prediction system of the autonomous vehicle to predict a future behavior of a vehicle in the environment, e.g., predicting a future trajectory of the vehicle in the environment based on the open door prediction.

For example, the open door prediction can indicate that the trunk of a particular vehicle in the vicinity of the autonomous vehicle is open. Based on this open door prediction, the behavior prediction system of the autonomous vehicle can determine that the particular vehicle is likely parked and stationary because people might be loading or unloading stuff from the trunk of the particular vehicle.

As another example, the open door prediction can indicate that the left door of a particular vehicle in the vicinity of the autonomous vehicle is open. Based on this open door prediction, the planning system of the autonomous vehicle can determine a trajectory of the autonomous vehicle to slow down near the particular vehicle and/or increase the lateral distance between the particular vehicle and the autonomous vehicle because people may enter or exit the open door of the particular vehicle.

In some implementations, the open door prediction can further include an open door segmentation prediction, and the system can provide the open door segmentation prediction as an input to a vehicle segmentation model of the planning system of the autonomous vehicle to generate a segmentation prediction of the vehicle. In some implementations, the open door segmentation prediction can be used by the planning system of the autonomous vehicle to generate a more precise contour of the vehicle.

For example, the segmentation model of the planning system of the autonomous vehicle can generate an initial segmentation prediction of the main body of the vehicle that does not include the open door. The segmentation model can take as an input the open door segmentation prediction for the open door of the vehicle. The segmentation model can combine the open door segmentation prediction and the initial segmentation prediction, e.g., by an "OR" operation, or by generating a convex hull of the two segmentation predictions, to generate a more accurate segmentation prediction of the vehicle.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining sensor data (i) that comprises a portion of a point cloud generated by a laser sensor of an autonomous vehicle and (ii) that characterizes a second vehicle that is in a vicinity of the autonomous vehicle in an environment, wherein the sensor data further comprises an image patch depicting the second vehicle generated from an image of the environment captured by a camera sensor;
    processing the sensor data using an open door prediction neural network to generate an open door prediction that predicts a likelihood score that the second vehicle has an open door, wherein the open door prediction neural network comprises:
        a first embedding subnetwork that is configured to process the portion of the point cloud to generate a point cloud embedding characterizing the second vehicle;
        a second embedding subnetwork that is configured to process the image patch to generate an image embedding characterizing the second vehicle; and
        an output subnetwork that is configured to process the point cloud embedding and the image embedding to generate the likelihood score that the second vehicle has an open door; and
    providing an input comprising the open door prediction to a planning system of the autonomous vehicle to plan a future trajectory of the autonomous vehicle.

2. The method of claim 1, wherein the open door prediction further comprises an open door segmentation prediction that comprises, for each point of the portion of the point cloud, a per-point likelihood that predicts a likelihood that the point corresponds to the open door.

3. The method of claim 2, further comprising:
    providing an input comprising the open door segmentation prediction to a vehicle segmentation model that is used by the planning system of the autonomous vehicle to generate a segmentation prediction of the second vehicle.

4. The method of claim 1, wherein the open door prediction neural network comprises a PointNet neural network.

5. The method of claim 1, wherein the open door prediction neural network comprises a Range Sparse Net neural network.

6. The method of claim 1, wherein the sensor data further comprises a second portion of a second point cloud generated by a second laser sensor that has a shorter range than the laser sensor.

7. The method of claim 1, wherein the open door prediction neural network comprises:
    a concatenation layer that concatenates the point cloud embedding and the image embedding to generate a concatenated embedding; and
    the output subnetwork is configured to process the concatenated embedding to generate the likelihood score that the second vehicle has an open door.

8. The method of claim 1, wherein the open door comprises at least one of the following: a left door, a right door, a hood, a trunk, a sliding door.

9. A system comprising one or more computers and one or more storage devices storing instructions that are operable, when executed by the one or more computers, to cause the one or more computers to perform operations comprising:
    obtaining sensor data (i) that comprises a portion of a point cloud generated by a laser sensor of an autonomous vehicle and (ii) that characterizes a second vehicle that is in a vicinity of the autonomous vehicle in an environment, wherein the sensor data further comprises an image patch depicting the second vehicle generated from an image of the environment captured by a camera sensor;
    processing the sensor data using an open door prediction neural network to generate an open door prediction that predicts a likelihood score that the second vehicle has an open door, wherein the open door prediction neural network comprises:
        a first embedding subnetwork that is configured to process the portion of the point cloud to generate a point cloud embedding characterizing the second vehicle;
        a second embedding subnetwork that is configured to process the image patch to generate an image embedding characterizing the second vehicle; and an output subnetwork that is configured to process the point cloud embedding and the image embedding to generate the likelihood score that the second vehicle has an open door; and providing an input comprising the open door prediction to a planning system of the autonomous vehicle to plan a future trajectory of the autonomous vehicle.

10. The system of claim 9, wherein the open door prediction further comprises an open door segmentation prediction that comprises, for each point of the portion of the point cloud, a per-point likelihood that predicts a likelihood that the point corresponds to the open door.

11. The system of claim 10, the operations further comprise:

providing an input comprising the open door segmentation prediction to a vehicle segmentation model that is used by the planning system of the autonomous vehicle to generate a segmentation prediction of the second vehicle.

12. The system of claim 9, wherein the open door prediction neural network comprises a PointNet neural network.

13. The system of claim 9, wherein the open door prediction neural network comprises a Range Sparse Net neural network.

14. The system of claim 9, wherein the sensor data further comprises a second portion of a second point cloud generated by a second laser sensor that has a shorter range than the laser sensor.

15. The system of claim 9, wherein the open door prediction neural network comprises:

a concatenation layer that concatenates the point cloud embedding and the image embedding to generate a concatenated embedding; and the output subnetwork is configured to process the concatenated embedding to generate the likelihood score that the second vehicle has an open door.

16. The system of claim 9, wherein the open door comprises at least one of the following: a left door, a right door, a hood, a trunk, a sliding door.

17. One or more non-transitory computer storage media encoded with computer program instructions that when executed by a plurality of computers cause the plurality of computers to perform operations comprising:

obtaining sensor data (i) that comprises a portion of a point cloud generated by a laser sensor of an autonomous vehicle and (ii) that characterizes a second vehicle that is in a vicinity of the autonomous vehicle in an environment, wherein the sensor data further comprises an image patch depicting the second vehicle generated from an image of the environment captured by a camera sensor;

processing the sensor data using an open door prediction neural network to generate an open door prediction that predicts a likelihood score that the second vehicle has an open door, wherein the open door prediction neural network comprises:

a first embedding subnetwork that is configured to process the portion of the point cloud to generate a point cloud embedding characterizing the second vehicle;

a second embedding subnetwork that is configured to process the image patch to generate an image embedding characterizing the second vehicle; and an output subnetwork that is configured to process the point cloud embedding and the image embedding to generate the likelihood score that the second vehicle has an open door; and providing an input comprising the open door prediction to a planning system of the autonomous vehicle to plan a future trajectory of the autonomous vehicle.

18. The non-transitory computer storage media of claim 17, wherein the open door prediction further comprises an open door segmentation prediction that comprises, for each point of the portion of the point cloud, a per-point likelihood that predicts a likelihood that the point corresponds to the open door.

19. The non-transitory computer storage media of claim 18, the operations further comprise:

providing an input comprising the open door segmentation prediction to a vehicle segmentation model that is used by the planning system of the autonomous vehicle to generate a segmentation prediction of the second vehicle.

20. The non-transitory computer storage media of claim 17, wherein the sensor data further comprises a second portion of a second point cloud generated by a second laser sensor that has a shorter range than the laser sensor.

* * * * *